Köhler & Alsing,
Butchers' Block.
No. 95,914.        Patented Oct. 19, 1869.
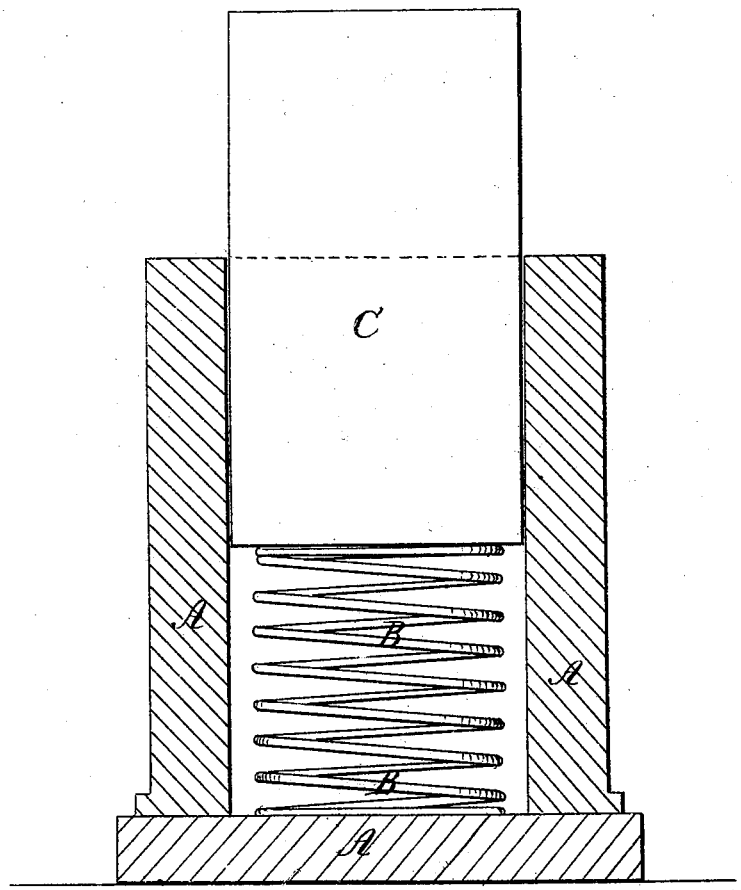
Witnesses
O. Hinchman
Jno. K. Brooks
Inventor
F. Köhler
A. S. Alsing
PER Munn & Co.
Att'ys

United States Patent Office.

FREDERICK KÖHLER AND A. J. ALSING, OF NEW YORK, N. Y.

Letters Patent No. 95,914, dated October 19, 1869.

IMPROVED SPRING POUNDING AND CHOPPING-BLOCK.

The Schedule referred to in these Letters Patent and making part of the same.

To all whom it may concern:

Be it known that we, FREDERICK KÖHLER and A. J. ALSING, of the city, county, and State of New York, have invented a new and improved Spring Pounding or Chopping-Block; and we do hereby declare that the following is a full, clear, and exact description thereof, which will enable others skilled in the art to make and use the same, reference being had to the accompanying drawing, forming part of this specification.

The drawing represents a sectional elevation of our improved apparatus.

This invention has for its object to provide a simple mechanism for preventing the noise produced by machinery, or by the splitting of wood, chopping of meat, and by other pounding-devices, as well as for reducing the strain produced by the striking or pounding-process.

The invention consists in providing a box-shaped support, A, which carries a spring or springs, B, on its bottom, and which is placed upon the floor on which the machine is to be supported.

A block, C, placed upon these springs and into the box, as in the drawing, will thus have a yielding support.

If wood is split or meat chopped upon it, it will yield more or less.

The spring will receive the direct shock of each stroke, and will therefore prevent the injury of floors and ceilings which generally results from any chopping or hammering in buildings.

The noise produced by such hammering is also considerably diminished by the interposition of the spring. In fact the operations will almost be entirely noiseless.

Machinery of suitable kind, such as sewing-machines, and especially such making much noise, can also be placed upon spring platforms that are supported on springs in a box, A, and the disagreeable noise produced by them will become deadened.

Having thus described our invention,

What we claim as new, and desire to secure by Letters Patent, is—

An apparatus for reducing and diminishing the shocks and noise of machinery and of pounding-instruments, consisting of the box-shaped support A, the spring or springs B, and the block C, substantially as herein shown and described.

F. KÖHLER.
A. J. ALSING.

Witnesses:
FRANK BLOCKLEY,
ALEX. F. ROBERTS.